(12) United States Patent
Bachmann

(10) Patent No.: US 7,982,666 B2
(45) Date of Patent: Jul. 19, 2011

(54) SYSTEM AND METHOD FOR INCREASING SPECTRAL RESOLUTION

(75) Inventor: Svetlana M. Bachmann, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 211 days.

(21) Appl. No.: 12/401,425

(22) Filed: Mar. 10, 2009

(65) Prior Publication Data
US 2010/0231439 A1 Sep. 16, 2010

(51) Int. Cl.
*G01S 7/285* (2006.01)
*G01S 13/00* (2006.01)

(52) U.S. Cl. ......... 342/195; 342/26 R; 342/89; 342/118; 342/134; 342/175; 342/192; 342/194

(58) Field of Classification Search ............ 342/82–103, 342/118, 134–145, 175, 192–197, 25 R–26 D, 342/147, 156, 159; 367/118–123; 375/316, 375/322, 334, 335
See application file for complete search history.

(56) References Cited

U.S. PATENT DOCUMENTS

| | | | | |
|---|---|---|---|---|
| 5,483,500 A * | 1/1996 | Capell et al. | ................... | 367/119 |
| 5,663,930 A * | 9/1997 | Capell et al. | ................... | 367/119 |
| 5,686,922 A * | 11/1997 | Stankwitz et al. | ............ | 342/196 |
| 6,121,918 A * | 9/2000 | Tullsson | ...................... | 342/159 |
| 6,204,809 B1 * | 3/2001 | Sezai | ........................... | 342/156 |
| 6,618,449 B1 * | 9/2003 | Laviec et al. | ................. | 375/335 |
| 6,970,129 B2 * | 11/2005 | Kumon et al. | ................ | 342/195 |
| 7,006,031 B1 * | 2/2006 | Abatzoglou et al. | ........ | 342/25 A |
| 7,151,478 B1 * | 12/2006 | Adams et al. | ................ | 342/175 |
| 7,180,443 B1 * | 2/2007 | Mookerjee et al. | ........... | 342/195 |
| 7,277,046 B2 * | 10/2007 | Adams et al. | ................. | 342/139 |
| 7,348,917 B2 * | 3/2008 | Stankwitz et al. | .......... | 342/25 R |
| 7,532,150 B1 * | 5/2009 | Abatzoglou et al. | ........ | 342/25 F |
| 2005/0057391 A1 * | 3/2005 | Forsley et al. | ............. | 342/25 A |
| 2006/0170585 A1 * | 8/2006 | Stankwitz et al. | .......... | 342/25 A |

OTHER PUBLICATIONS

Hubbert, J.C. et al., "Real time clutter identification and mitigation for NEXRAD", 23th Conf. on Interact. Inform. Proc. Sys., AMS San Antonio, TX, 5B.6, 2007. http://ams.confex.com/ams/pdf[a[ers/117270.pdf.

Siggia, D. et al., "Gaussian Model Adaptive Processing (GMAP) for improved ground clutter cancellation and moment calculation," Proceedings of ERAD (2004), Copernicus GmbH, 67-73, 2004. http://www.copernicus.org/erad/2004/online/ERAD04_P_67.pdf.

Bachmann, S., "Phase-Based Clutter Identification in Spectra of Weather Radar Signals", IEEE Geosci. and Remote Sens. Let., 5(3), 2008, pp. 487-491. http://ieeexplore.ieee.org/Xplore/login.jsp?url=/iel5/8859/4567424/04539642.pdf?arnumber=4539642.

(Continued)

*Primary Examiner* — Bernarr E Gregory
(74) *Attorney, Agent, or Firm* — Howard IP Law Group, PC

(57) ABSTRACT

A system and method for extrapolating sampled radar data allows in one aspect spectral data to be increased without increasing scan time and in another aspect allows scan time to be decreased without decreasing radar data quality. Extrapolation is carried out by extending a sequence of In-Phase and Quadrature-Phase samples by appending additional samples to each end of the sequence. Extrapolated samples are selected to maintain the statistical properties of the original sequence. Applying conventional windowing techniques to the extrapolated sample set results in a weighted extrapolated sequence having a corresponding Doppler spectrum with an increased spectral resolution.

21 Claims, 6 Drawing Sheets

OTHER PUBLICATIONS

Moisseev, D. et al., "Adaptive clutter filtering using dual-polarization spectral decompositions", the 5th European Conf. on radar in Meterol. and Hidrology, Helsinki, Finland 2008. http://erad2008.fmi.fi/proceedings/extended/erad2008-0157-extended.pdf.

Ice R. et al., "Optimizing clutter filtering in the WSR-88D", 23rd Conf. on IIPS, American Meterological Society, p. 2.11, 2007. http://ams.confex.com/ams/pdfpapers/116863.pdf.

Committee on the Evaluation of the Multifuncitn Phased Array Radar Planning Process; National Research Council, "Evaluation of the Multifuncton Phased Array Radar Planning Process", National Academy Press, 92 pp, 2008. http://www.nap.edu/catalog.php?record_id=12438.

NSSL/NOAA Report 11 about the SPRT an dits performance. http://cimms.ou.edu/rvamb/Documents/Report_11.pdf.

Radar info-dwell times, pulse widths:—pulse-width is 1.57 us (see p. 9 (19 of 94). http://cimms.ou.edu/!slana/files/thesis/Svetlana_Bachmann_thesis.pdf.

Dwell times are on the order of 50 ms (see p. 4 (10/152). http://cimms.ou.edu/rvamb/Documents/Report_11.pdf.

* cited by examiner

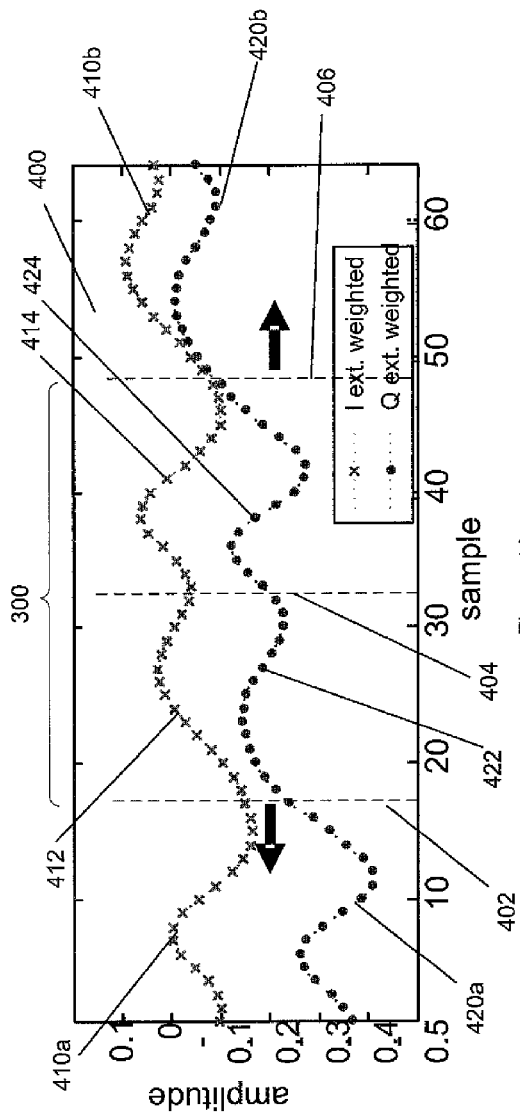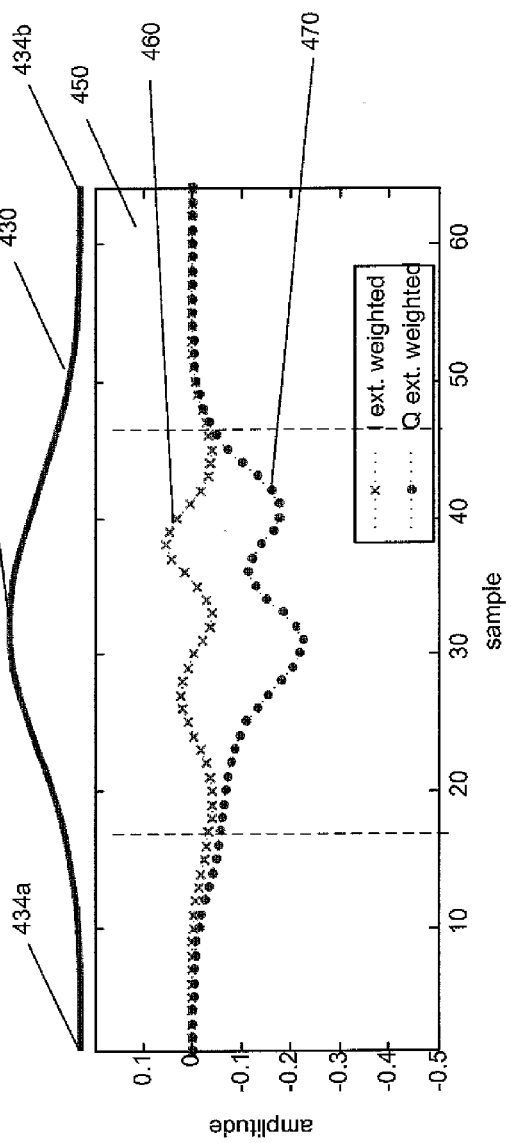

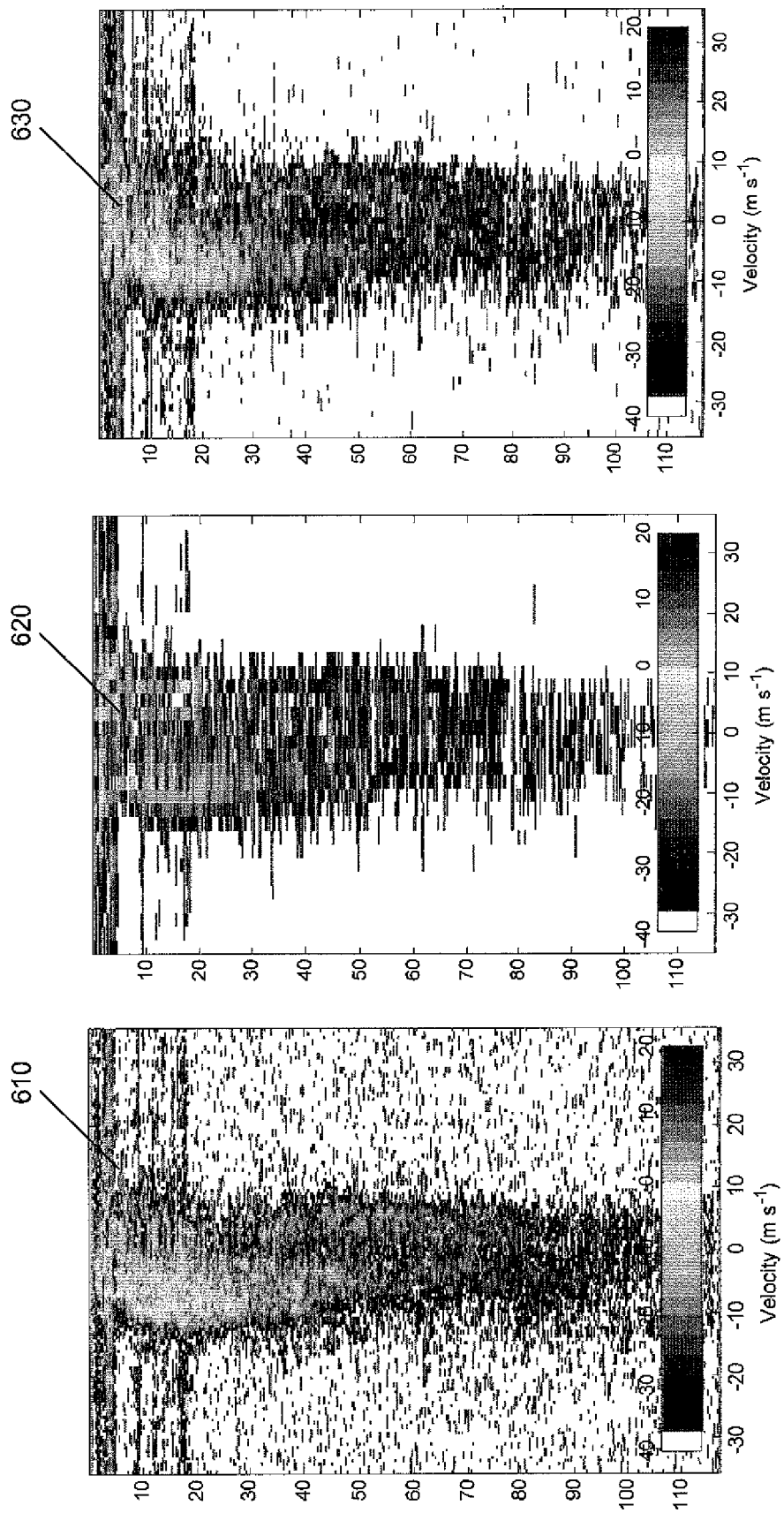

SYSTEM AND METHOD FOR INCREASING SPECTRAL RESOLUTION

FIELD OF THE INVENTION

The present invention relates generally to radar systems and particularly to increasing spectral resolution.

BACKGROUND

Increasing update rates for rotational antenna radar systems such as those currently employed in weather radar systems continues to be a problem. One such method for increasing update rates involves reducing radar scan time. Scan time may be reduced by shortening dwell time which is accomplished by transmitting fewer pulses. However, transmitting fewer pulses causes a decrease in spectral resolution of the observed radar data. Current methods for increasing radar update rates thus undesirably result in corresponding losses in radar data quality. Increasing the spectral resolution of current weather radar systems is desirable to improve clutter suppression, particularly when lowering the radar beam closer to the ground. Spectral resolution can be improved by increasing dwell time and in turn number of pulses, however scan time increases accordingly. Thus, current methods for increasing radar data quality lead to undesirably slower radar update rates. Improvements to existing radar systems to allow radar data quality to be increased without an increase in scan time or to allow scan time to be decreased without a decrease in radar data quality are thus desired.

BRIEF DESCRIPTION OF THE DRAWINGS

FIG. 4A is a graph illustrating an exemplary IQ sequence in accordance with an exemplary embodiment of the invention.

FIG. 4B is a graph illustrating an exemplary weighted IQ sequence in accordance with an exemplary embodiment of the invention.

FIG. 6A is a graph illustrating an exemplary 128-pulse ground truth clutter weather spectrum. FIG. 6B is a graph illustrating an exemplary conventional 32-pulse clutter-filtered weather spectrum. FIG. 6C is a graph illustrating an exemplary extrapolated 64-pulse clutter-filtered weather spectrum in accordance with an exemplary embodiment of the invention.

DETAILED DESCRIPTION

Reference will now be made in detail to the present exemplary embodiments of the invention, examples of which are illustrated in the accompanying drawings.

Figure 1:
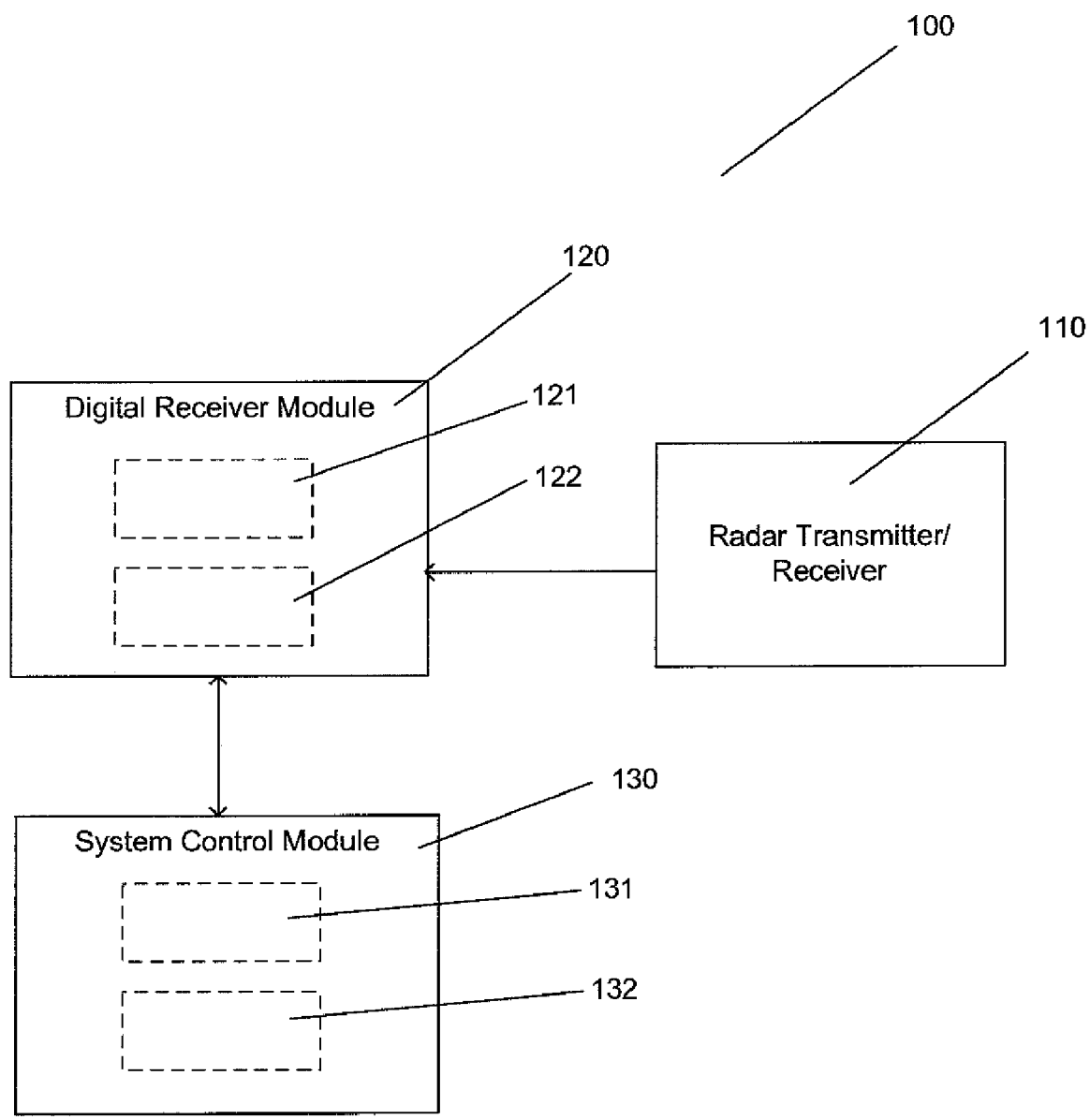
FIG. 1 is a block diagram illustrating a radar system in accordance with an exemplary embodiment of the invention.

According to an aspect of the present invention, there is described herein a system and method that "extends" data sequences prior to application of fixed weights (e.g. weighting a pulse train) without reliance on zero-padding. Referring to FIG. 1, a block diagram is shown illustrating a radar system 100 in accordance with an exemplary embodiment of the invention. The radar system 100 includes a radar transmitter/receiver 110, a digital receiver module 120 and a system control module 130. By way of example only, the transmitter/receiver may be an S-Band rotational antenna radar. The digital receiver module 120 will receive raw radar data from the radar transmitter/receiver 110 and is responsible for processing the radar data to a form to be passed on to system control module 130. The digital receiver module 120 may include an intermediate frequency (IF) digitizer 121 containing an analog to digital to converter such as a 14-bit analog to digital converter. The digital receiver module 120 may also include a circuit card assembly 122 for performing matched filtering and converting the digitized IF signal to In-Phase (I) and Quadrature-Phase (Q) sequence values. The digital receiver module 120 is further responsible for passing the IQ sequence values to a system control module 130. The system control module 130 may include an extrapolation module 131 for performing data sequence extrapolation on the receive IQ sequence values. The system control module 130 may also include a signal processing module 132 for performing functions such as weighting and ground clutter filtering and may further comprise a signal processor for performing such functions. By way of example only, the digital receiver module 120 and signal processing module 132 may be similar to those found in the open radar data acquisition (ORDA) design employed in current US weather radar systems.

Figure 2:
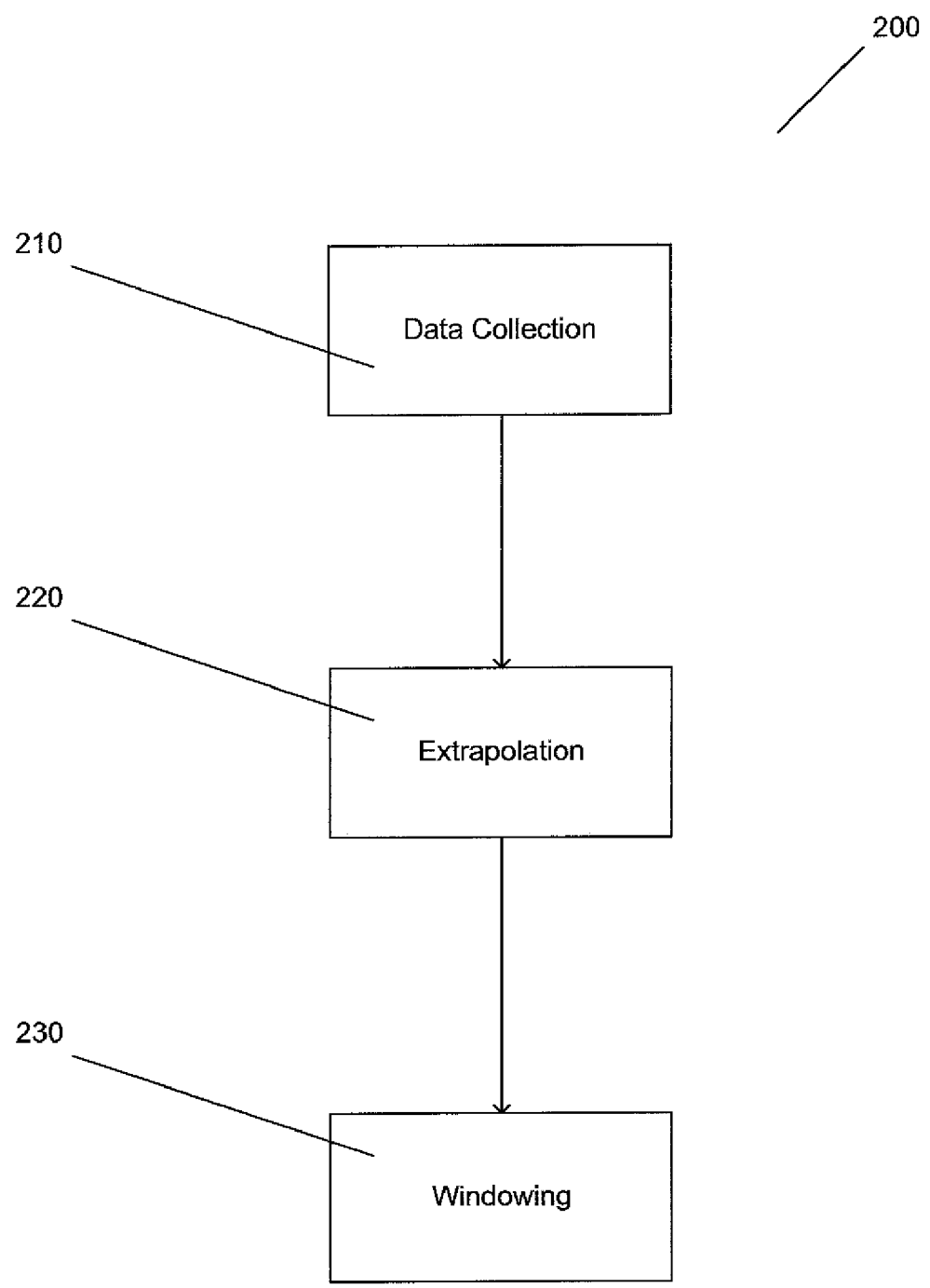
FIG. 2 is a flow diagram illustrating a process in accordance with an exemplary embodiment of the invention.
Figure 3A:
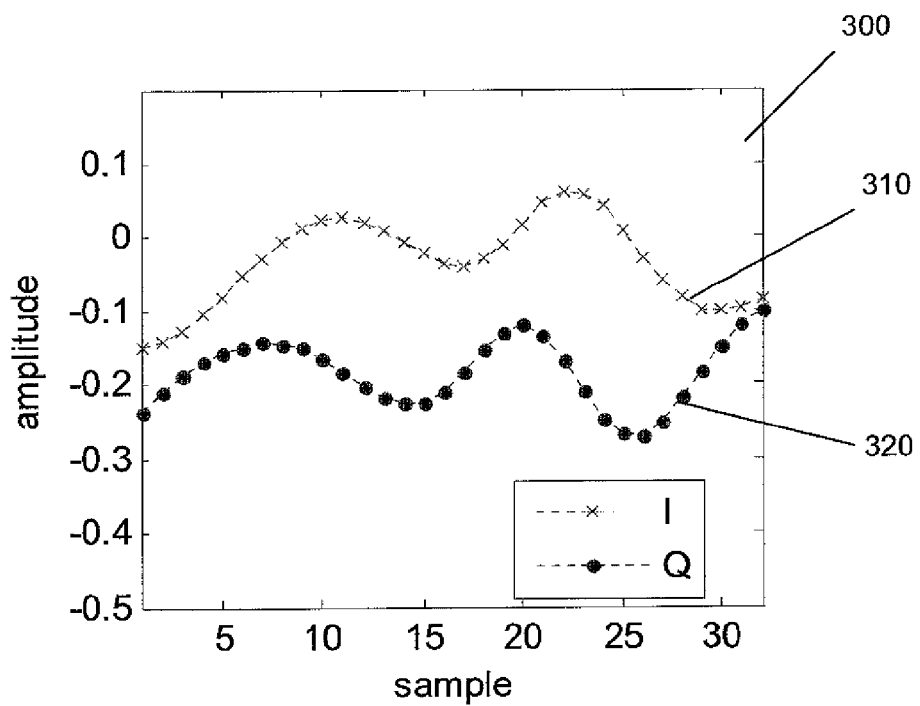
FIG. 3A is a graph illustrating an exemplary In-Phase (I) Quadrature-Phase (Q) sequence.
Figure 3B:
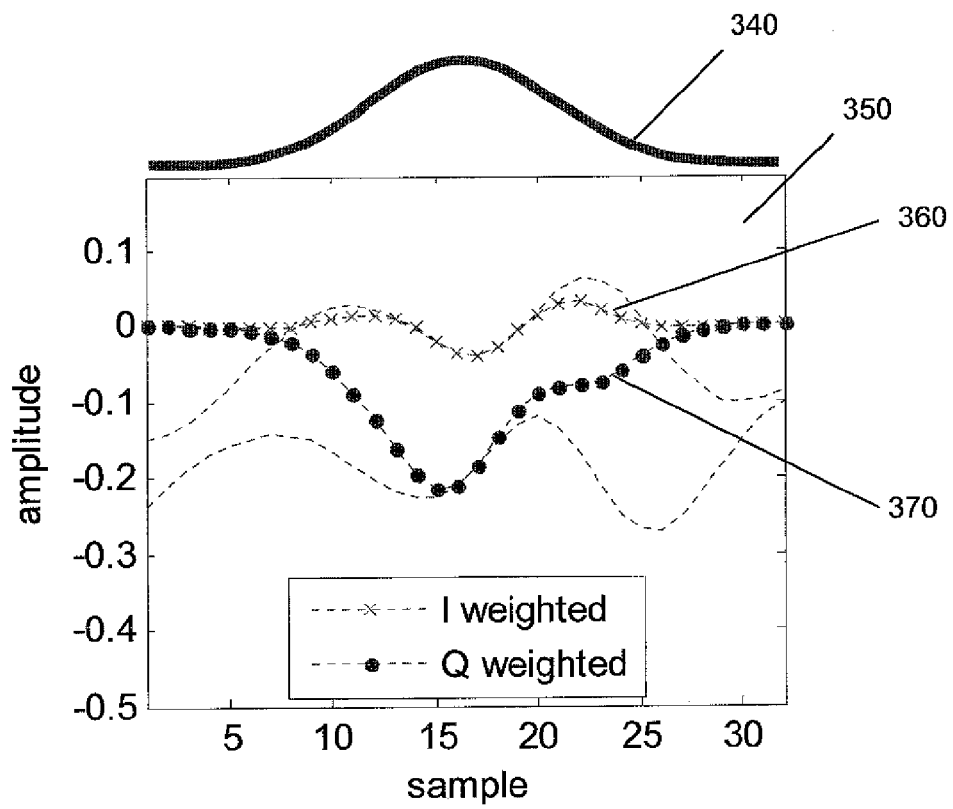
FIG. 3B is a graph illustrating an exemplary weighted IQ sequence.

Referring now to FIG. 2, a flow diagram is shown illustrating a process 200 in accordance with an exemplary embodiment of the invention. At a first step labeled as 210, a discrete In-Phase (I) and Quadrature-Phase (Q) sequence is first constructed by the card assembly 122 of the digital receiver module 120. The IQ sequence is constructed following transmission of a series of pulses by transmitter/receiver 110 and is based on measurements of energy backscattered from a specific range location. By way of example only, ten or more pulses may be transmitted having pulse widths of approximately 1.57 microseconds (μs) and a dwell time of approximately 50 milliseconds (ms). An equal number of discrete IQ measurements form the IQ sequence. In conventional systems and in a presence of ground clutter contamination the IQ sequence is then weighted using a windowing function such as a Blackman weighting window. The windowing step is carried out to prevent spectral spillage that occurs from a strong frequency component to adjacent weaker components. Spectral spillage is related to the finite nature of the IQ sequence and the presence of ground clutter. Such spectral spillage introduces an increased level of noise to the Doppler spectrum of the IQ sequence. The windowing function reduces perturbations on the edges of the sequence by smoothly decreasing the values on each end of data to a value of zero. By suppressing the samples on the edges of the IQ sequence the data is forced to have at least 1 period, starting with a value of zero and ending with a value of zero. Forcing the data to be periodic minimizes the effect of leakage to better represent the spectrum of the data. The samples located closer to the center of the sequence are preserved. Windowing allows an IQ sequence to be generated having a Doppler spectrum with a lower level of spectral noise. However, suppression of the samples located on the edges of the original sequence makes these sample data insignificant and undesirably causes an increase in the spectral width of clutter. FIGS. 3A and 3B illustrate a conventional windowing approach.

Referring now to FIG. 3A, a graph is shown illustrating an IQ sequence 300 that may be constructed during the data collection step 210 of process 200. As shown, the IQ sequence 300 comprises a discrete and finite number of I and Q measurements, labeled as 310 and 320 respectively. As discussed, the finite nature of the IQ sequence 300 along with the presence of ground clutter will cause spectral spillage unless a windowing procedure is carried out. FIG. 3B discloses the result of applying such a windowing function.

Referring now to FIG. 3B a graph is shown illustrating a weighted IQ sequence 350. Also shown in FIG. 3B is a graphical representation of a conventional windowing function labeled as 340. By way of example only, the windowing function 340 may be a Blackman window. The windowing function 340 has a peak magnitude at the center of the function and a decreasing magnitude towards the edges of the function where it reaches zero. Applying the windowing function 340 to the IQ sequence 300 of FIG. 3A results in the corresponding IQ sequence 350, consisting of another discrete and finite number of I and Q samples, labeled as 360 and 370 respectively. The windowing function 340 has the effect of preserving the samples of IQ sequence 300 located towards the center of the sequence and suppressing the magnitude of additional samples close to the edges. In this manner, IQ sequence 350 is now forced to be periodic, starting and ending with a magnitude of zero. As discussed, the Doppler spectrum associated with IQ sequence 350 will have decreased spectral noise level as compared with the Doppler spectrum of IQ sequence 300 of FIG. 3A; however, it will also undesirably have an increased spectral width of clutter.

Referring back to FIG. 2, at a next step labeled as 220 the extrapolation module 131 performs an extrapolation procedure on the original IQ sequence to overcome problems associated with the conventional windowing procedure. In particular, the proceeding process will advantageously mitigate suppression of IQ samples located at the edges of the IQ sequence. In this manner, spectral resolution may be increased without increasing the number of samples (i.e. increasing the number of transmitted pulses). This procedure alternately allows spectral resolution to be maintained while decreasing the number of samples (i.e. decreasing the number of transmitted pulses), in turn allowing radar scan times to be reduced without an undesirable loss of data quality. The extrapolation step 220 proceeds by appending additional IQ values having similar statistical properties as the original IQ sequence to the beginning and end of the original IQ sequence. An exemplary extrapolation procedure will now be discussed with reference to FIG. 4a.

Referring now to FIG. 4A, an extrapolated IQ sequence 400 is shown. The extrapolated IQ sequence 400 includes the exemplary original IQ sequence 300 of FIG. 3A as well two additional sets of I samples, labeled as 410a and 410b, appended to the beginning and end of the original sequence 310 of I samples respectively. The extrapolated IQ sequence 400 further includes two additional sets of Q samples, labeled as 420a and 420b, appended to the beginning and end of the original sequence 320 of Q samples respectively. In the exemplary embodiment the appended I and Q data sets, 410a, 410b, 420a and 420b are based on a pattern found within the original IQ sequence. An exemplary extrapolation process proceeds as follows. The original IQ sequence 300 is equally divided to form four sets of data, separated as shown by the dashed dividing line labeled as 404. The original I sequence 310 is divided into two sets labeled as 412 and 414. The original Q sequence 320 is similarly divided into two sets labeled as 422 and 424. The appended I and Q data sets, 410a, 410b, 420a and 420b are based on the divided data sets 412, 414, 422 and 424 to preserve the statistical properties of the original IQ sequence 300. In an exemplary embodiment the first half of the original I sequence, 412, is time shifted by 1 sample and appended to the end of the original I sequence 310 to form appended data set 410b. The second half of the original I sequence 414 is appended to the beginning of the original I sequence 310 to form appended data set 410a. The first half of the original Q sequence 422 is appended to the end of the original I sequence 310 to form appended data set 420b. The second half of the original Q sequence, 424, is time shifted by 1 sample and appended to the beginning of the original Q sequence 320 to form appended data set 420a. The magnitudes of the appended data sets 410a, 410b, 420a and 420b are also shifted so that the extrapolated IQ sequences are substantially continuous across the boundaries between the original IQ sequence 300 and the appended IQ data sets, labeled as lines 402 and 406 respectively. The result of the preceding extrapolation steps is shown in FIG. 4A. In an alternate embodiment the first half of the original I sequence 412 is time shifted by 1 sample and appended to the beginning of the original I sequence 310 to form appended data set 410a. The second half of the original I sequence 414 is appended to the end of the original I sequence 310 to form appended data set 410b. The first half of the original Q sequence, 422, is appended to the beginning of the original Q sequence 320 to form appended data set 420a. The second half of the original Q sequence, 424, is time shifted by 1 sample and appended to the end of the original Q sequence 320 to form appended data set 420b. Time shifting the appended I or Q data sets creates completely new complex samples but with similar statistical properties as the original IQ sequence. The magnitudes of the appended data sets are also shifted so that the extrapolated IQ sequences are substantially continuous across boundaries 402 and 406. Another alternate extrapolation procedure will now be discussed with reference to FIG. 5A.

Figure 5A:
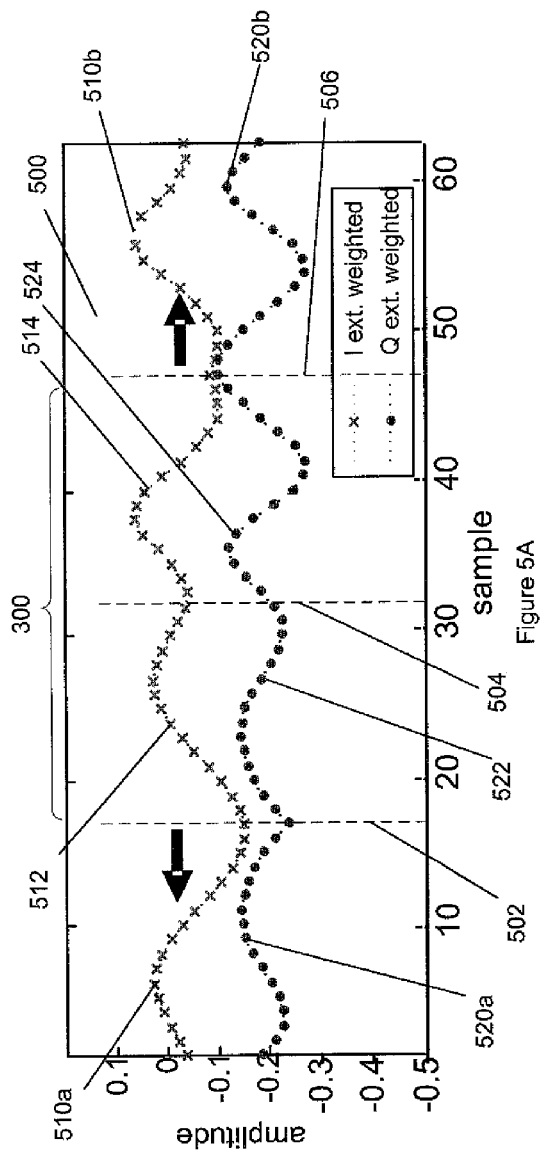
FIG. 5A is a graph illustrating an exemplary IQ sequence in accordance with an exemplary embodiment of the invention.

Referring now to FIG. 5A, an extrapolated IQ sequence 500 is shown. The extrapolated IQ sequence 500 includes the exemplary original IQ sequence 300 of FIG. 3A as well two additional sets of I samples, labeled as 510a and 510b, appended to the beginning and end of the original I sequence 310 respectively. The extrapolated IQ sequence 500 further includes two additional sets of Q samples, labeled as 520a and 520b, appended to the beginning and end of the original Q sequence 320 respectively. In the exemplary embodiment the appended I and Q data sets 510a, 510b, 520a and 520b are based on a pattern found within the original IQ sequence 300. An exemplary extrapolation proceeds as follows. The original IQ sequence 300 is equally divided to form four sets of data, separated as shown by the dashed dividing line labeled as 504. The original I sequence 310 is divided into two sets labeled as 512 and 514. The original Q sequence 320 is similarly divided into two sets labeled as 522 and 524. The appended I and Q data sets, 510a, 510b, 520a and 520b are extrapolated from divided data sets 512, 514, 522 and 524 to preserve the statistical properties of the original IQ sequence 300. Appended data set 510a is formed by mirroring each of the samples of the first half of the original I sequence 412 across a vertical boundary line, labeled as 502, that crosses through the first sample of the original I sequence 310. Appended data set 510b is formed by mirroring each of the samples of the second half of the original I sequence 514 across a vertical boundary line, labeled as 506, that crosses through the last sample of the original I sequence 310. Appended data set 520a is formed by mirroring each of the samples of the first half of the original Q sequence 522 across vertical boundary line 502. Appended data set 520b is formed by mirroring each of the samples of the second half of the original Q sequence 524 across vertical boundary line labeled as 506. Either the appended I or Q data sets are also time shifted by one sample. This time shift creates completely new complex samples having similar statistical properties as the original IQ sequence. In this manner the statistical properties of the original IQ sequence 300 are preserved in the extrapolated IQ sequence 500. It is to be understood that the exemplary extrapolation procedures are in no way limited to the replacement or mirroring processes described herein. Any extrapolation process which substantially preserves the statistical properties of the original 10 sequence may be used.

Referring back to FIG. 2, process 200 proceeds at windowing step 230. At this point the signal processing module 132 of system control module 130 receives the extrapolated IQ sequence and applies a conventional windowing function, such as a Blackman window, to the extrapolated data. However, due to the additional samples appended to the ends of each of the I and Q sequences the detrimental effects of the windowing function are avoided since the data samples that are substantially suppressed are those that have been artificially added. The data samples located close to the ends of the original IQ sequence are no longer significantly suppressed. Recovery of these samples advantageously leads to an increase in the spectral resolution of the associated Doppler spectrum. Moreover, by maintaining the statistical properties of the original IQ sequence the windowing function is still able to generate a weighted IQ sequence having a Doppler spectrum with reduced spectral noise.

Referring now to FIG. 4B, a graph is shown illustrating a weighted IQ sequence 450. Also shown in FIG. 4B is a graphical representation of a conventional weighting function labeled as 430. By way of example only, the weighting function 430 may be a Blackman window. The weighting function 430 has a peak magnitude 432 at the center of the function and a decreasing magnitude approaching the edges 434a and 434b of the function where it reaches zero. Applying the window function 430 to the extrapolated IQ sequence 400 of FIG. 4A results in the corresponding weighted extrapolated IQ sequence 450, consisting of another discrete and finite number of I and Q samples, labeled as 460 and 470 respectively. The windowing function 430 has the effect of preserving the samples of extrapolated IQ sequence 400 located towards the center of the sequence and suppressing the magnitude of additional samples close to the edges. In this manner, the weighted extrapolated IQ sequence 450 is forced to be periodic, starting and ending with a magnitude of zero. However, because the samples of the original IQ sequence are no longer located near the edge of the sequence these samples are not significantly suppressed by the windowing function 430. The Doppler spectrum associated with weighted extrapolated IQ sequence 450 will have decreased spectral noise as compared with the Doppler spectrum of extrapolated IQ sequence 400 of FIG. 4A. However, unlike the Doppler spectrum of the weighted IQ sequence 350 of FIG. 3B, the Doppler spectrum of the weighted extrapolated IQ sequence 450 will not have a detrimental increase in spectral width of clutter and will advantageously have an increased spectral resolution.

Figure 5B:
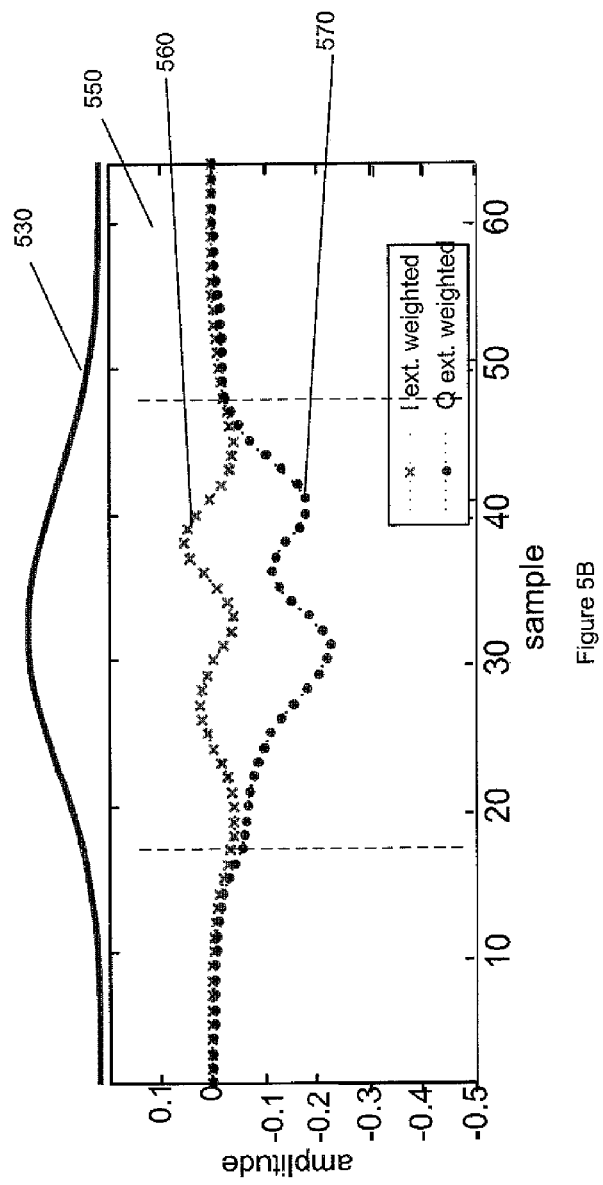
FIG. 5B is a graph illustrating an exemplary weighted IQ sequence in accordance with an exemplary embodiment of the invention

Referring now to FIG. 5B, a graph is shown illustrating another weighted IQ sequence 550. Also shown in FIG. 5B is a graphical representation of a conventional weighting function labeled as 530. By way of example only, the weighting function 530 may be a Blackman window. Applying the window function 530 to the extrapolated IQ sequence 500 of FIG. 5A results in the corresponding weighted extrapolated IQ sequence 550, consisting of another discrete and finite number of I and Q samples, labeled as 560 and 570 respectively. Applying the windowing function 530 preserves the samples of extrapolated IQ sequence 500 located towards the center of the sequence and suppresses the magnitude of additional samples close to the edges. In this manner, extrapolated IQ sequence 500 is now forced to be periodic, starting and ending with a magnitude of zero. However, because the samples of the original IQ sequence are no longer located close to the edge of the sequence these samples are not significantly suppressed by the windowing function 530. The Doppler spectrum associated with weighted extrapolated IQ sequence 550 will have decreased spectral noise as compared with the Doppler spectrum of extrapolated IQ sequence 500 of FIG. 5A. However, unlike the Doppler spectrum of the weighted IQ sequence 350 of FIG. 3B, the Doppler spectrum of the weighted extrapolated IQ sequence 550 will not have a detrimental increase in spectral width of clutter and will advantageously have an increased spectral resolution.

Referring now to FIG. 6A, FIG. 6B and FIG. 6C, graphs are shown illustrating spectral improvements associated with the data sequence extrapolation methods described herein. FIG. 6A shows an exemplary 128-pulse ground truth weather spectrum labeled as 610. FIG. 6B shows a 32-pulse weather spectrum 620 with ground clutter filtered after application of a conventional windowing function such as that discussed with reference to FIG. 3B. FIG. 6C shows a 64-pulse weather spectrum 630 with ground clutter filtered. The 64-pulse sequence is however derived from the 32-pulse sequence by the extrapolation methods discussed with reference to FIG. 4B and subsequently weighted by conventional windowing. As shown, the weather spectra 630 of FIG. 6C has improved spectral resolution relative to the weather spectrum 620 of FIG. 6B having a spectral resolution closer to the 128-pulse ground truth weather spectrum 610 shown in FIG. 6A. This increase in spectral-resolution is achieved without an additional increase in spectral width of clutter.

It is to be understood that the above extrapolation procedure, while discussed with application to rotational radar systems, may be useful in any system that uses windowing including, by way of example only, other types of radar such as stationary radar systems, electronically steerable systems, sonar, image processing, and stochastic signal processing systems.

The above extrapolation procedure may also be applied to systems, such as weather radar systems, that employ Staggered Pulse Repetition Time (SPRT) data collection strategies to mitigate range-velocity ambiguity. In such systems problems arise when attempting to filter clutter. In order to make the sampled data uniform, zeroes are currently inserted between the staggered samples. As a result, both clutter and weather is replicated in multiple locations across the Doppler spectrum. After applying conventional methods for filtering ground clutter, such as notch filtering, selection of the correct weather replica can become difficult since spectral data associated with weather may also be lost during the filtering process. This problem can be mitigated by increasing the spectral resolution which can be achieved by increasing dwell time or increasing the Pulse Repetition Time (PRT). The latter mitigation technique has the additional undesirable effect of reducing the unambiguous range of the radar. To increase the spectral resolution without decreasing the unambiguous range of the radar the present extrapolation procedures may be applied. By way of example only, a sample set generated by an SPRT algorithm that transmits pairs of pulses, in effect have alternating PRTs, may be split into two sets of samples. Each set may then be extended by the disclosed methods, and subsequently recombined thereby increasing the number of samples while preserving the statistical properties of the original sequence The reconstructed sequence may then be processed using conventional ground clutter filtering for staggered sequences. The resulting spectrum will have an increased resolution thus allowing weather to be identified for larger PRT values.

Those of ordinary skill will appreciate that the various illustrative modules and steps described in connection with the embodiments disclosed herein may be implemented as electronic hardware, computer software, or combinations of both. The various illustrative steps have been described generally in terms of their functionality. Those of ordinary skill in the art will recognize the interchangeability of hardware and software under these circumstances, and how best to implement the described functionality for each particular application. As examples, the various illustrative modules and steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components, a conventional programmable software module and a processor, or any combination thereof designed to perform the functions described herein. The processor may be a microprocessor, any conventional processor, controller, microcontroller, programmable logic device, array of logic elements, or state machine. The software module could reside in RAM memory, flash memory, ROM memory, EPROM memory, EEPROM memory, hard disk, a removable disk, a CD, DVD or any other form of storage medium known in the art. An exemplary processor is may be coupled to the storage medium so as to read information from, and write information to, the storage medium. In the alternative, the storage medium may be integral to the processor.

In further embodiments, those skilled in the art will appreciate that the foregoing methods can be implemented by the execution of a program embodied on a computer readable medium. The medium may comprise, for example, RAM accessible by, or residing within the device. Whether contained in RAM, a diskette, or other secondary storage media, the instructions may be stored on a variety of machine-readable data storage media, such as a conventional "hard drive", magnetic tape, electronic read-only memory (e.g., ROM or EEPROM), flash memory, an optical storage device (e.g., CD, DVD, digital optical tape), or other suitable data storage media.

While the foregoing invention has been described with reference to the above-described embodiments, various modifications and changes can be made without departing from the spirit of the invention Accordingly, all such modifications and changes are considered to be within the scope of the appended claims.

What is claimed is:

1. A method of processing radar data comprising:
   receiving a sequence of samples, each of said received samples corresponding to a radar time series return for a particular range;
   determining a first set of extrapolated samples and a second set of extrapolated samples, said first and second sets of extrapolated samples having similar statistical properties to those of said received sequence of samples;
   appending said first set of extrapolated samples to a beginning of said received sequence of samples and said second set of extrapolated samples to an end of said sequence of samples to form an extrapolated sequence of samples;
   adapting amplitudes of said extrapolated samples to provide continuity between said first set of extrapolated samples and a beginning of said received sequence of samples and between said second set of extrapolated samples and an end of said received sequence of samples.

2. The method of claim 1, wherein said appending further comprises time-shifting said first set of extrapolated samples or said second set of extrapolated samples by one sample.

3. The method of claim 2, wherein said received sequence of samples is a sequence of In-Phase or Quadrature-Phase measurements associated with a particular radar range.

4. The method of claim 3, wherein said first set of extrapolated samples is substantially the same as a second half of said received sequence of samples and said second set of extrapolated samples is substantially the same as a first half of said received sequence of samples.

5. The method of claim 3, wherein said first set of extrapolated samples is substantially the same as a first half of said received sequence of samples and said second set of extrapolated samples is substantially the same as a second half of said received sequence of samples.

6. The method of claim 3, wherein said determining further comprises mirroring one or more of said samples of said received sequence of samples across the beginning of said received sequence of samples to form said first set of extrapolated samples and mirroring one or more of said samples of said received sequence of samples across the end of said received sequence of samples to form said second set of extrapolated samples.

7. The method of claim 3, wherein said receiving further comprises decomposing said received sequence of samples into two subsets of samples and wherein said steps of determining, appending and adapting are carried out for each of said subsets of samples to form first and second extrapolated sample sequences.

8. The method of claim 7, further comprising:
   recombining said first and said second extrapolated sample sequences to form a recombined sample sequence having a higher resolution frequency spectrum than said sampled sequence.

9. A method of processing radar data comprising:
   determining a sequence of In-Phase (I) samples and a sequence of Quadrature-Phase (Q) samples from a radar return signal, each of said I and Q samples corresponding to a radar time series return for a particular range;
   appending one or more extrapolated samples to a beginning of said I and Q sample sequences and to an end of said I and Q sample sequences to form an extrapolated I sample sequence and an extrapolated Q sample sequence, said extrapolated samples having similar statistical properties as said I and Q sample sequences;
   adapting a magnitude of each of said extrapolated samples to provide continuity between said extrapolated samples and the beginning and end of each of the I and Q sample sequences;
   wherein said extrapolated I and Q sample sequences have improved spectral resolution associated with application of a window weighting function than said determined I and Q sample sequences.

10. The method of claim 9, wherein said appending further comprises time-shifting one or more of said extrapolated samples associated with said In-Phase sequence or said Quadrature-Phase sequence by one or more samples.

11. The method of claim 9, wherein said one or more extrapolated samples appended to the beginning of said In-Phase and Quadrature-Phase sample sequences are derived from the samples in a second half of said In-Phase and Quadrature-Phase sample sequences and wherein said one or more extrapolated samples appended to the end of said In- Phase and Quadrature-Phase sample sequences are derived from the samples in a first half of said In-Phase and Quadrature-Phase sample sequences.

12. The method of claim 9, wherein said one or more extrapolated samples appended to the beginning of said In-Phase and Quadrature-Phase sample sequences are derived from the samples in a first half of said In-Phase and Quadrature-Phase sample sequences and wherein said one or more extrapolated samples appended to the end of said In-Phase and Quadrature-Phase sample sequences are derived from the samples in a second half of said In-Phase and Quadrature-Phase sample sequences.

13. The method of claim 9, wherein said one or more extrapolated samples are determined by mirroring one or more of said samples of said In-Phase and Quadrature-Phase sample sequences across a beginning or an end of the In-Phase or Quadrature-Phase sample sequence.

14. The method of claim 9, wherein said one or more extrapolated samples appended to the beginning of said In-Phase and Quadrature-Phase sample sequences are determined by mirroring one or more of said samples of said In-Phase and Quadrature-Phase sample sequences across a beginning of said sequences and wherein said one or more extrapolated samples appended to the beginning of said In-Phase and Quadrature-Phase sample sequences are determined by mirroring one or more of said samples of said In-Phase and Quadrature-Phase sample sequences across a beginning of said sequences.

15. A computer readable medium having a computer readable program code embodied therein, said computer readable program code adapted to be executed to implement a method of data extrapolation, said method comprising:
   receiving a sequence of samples, each of said received samples corresponding to a radar time series return for a particular range;
   determining a first set of extrapolated samples and a second set of extrapolated samples, said first and said second of said sets of extrapolated samples having similar statistical properties as said received sequence of samples;
   appending said first set of extrapolated samples to a beginning of said received sequence of samples and said second set of extrapolated samples to an end of said sequence of samples;
   adapting an amplitude of each of said extrapolated samples to provide continuity between said first set of extrapolated samples and a beginning of said received sequence of samples and between said second set of extrapolated samples and an end of said received sequence of samples to form an extrapolated sequence of samples.

16. The computer readable medium of claim 15, wherein said appending further comprises time-shifting said first set of extrapolated samples or said second set of extrapolated samples by one sample.

17. The computer readable medium of claim 16, wherein said sequence of samples is a sequence of In-Phase or Quadrature-Phase measurements associated with a particular radar range.

18. The computer readable medium of claim 16, wherein said first set of extrapolated samples is substantially the same as a second half of said received sequence of samples and said second set of extrapolated samples is substantially the same as a first half of said received sequence of samples.

19. The computer readable medium of claim 16, wherein said first set of extrapolated samples is substantially the same as a first half of said received sequence of samples and said second set of extrapolated samples is substantially the same as a second half of said received sequence of samples.

20. The computer readable medium of claim 16, wherein said determining further comprises mirroring one or more of said samples of said sequence across the beginning of said received sequence of samples to form said first set of extrapolated samples and mirroring one or more of said samples of said received sequence of samples across the end of said received sequence of samples to form said second set of extrapolated samples.

21. A radar system comprising:
   a radar adapted to generate a sequence of samples, each sample corresponding to a radar time series return for particular range;
   an extrapolation module adapted to append one or more extrapolated samples to a beginning and an end of said sample sequence to form an extrapolated sample sequence; and
   a data processing module adapted to:
   a) apply a windowing function to said extrapolated sample sequence to form a weighted extrapolated sample sequence;
   b) constructing a spectrum based on said weighted extrapolated sample set.

* * * * *